(12) United States Patent
Aissi et al.

(10) Patent No.: US 7,546,452 B2
(45) Date of Patent: Jun. 9, 2009

(54) HARDWARE-BASED CREDENTIAL MANAGEMENT

(75) Inventors: Selim Aissi, Beaverton, OR (US); Ned McArthur Smith, Beaverton, OR (US); Willard M. Wiseman, Vernonia, OR (US)

(73) Assignee: Intel Corporation, Santa Clara, CA (US)

( * ) Notice: Subject to any disclaimer, the term of this patent is extended or adjusted under 35 U.S.C. 154(b) by 853 days.

(21) Appl. No.: 10/225,504

(22) Filed: Aug. 20, 2002

(65) Prior Publication Data

US 2004/0039937 A1   Feb. 26, 2004

(51) Int. Cl.
*H04L 9/00* (2006.01)
*G06F 7/04* (2006.01)

(52) U.S. Cl. ............... 713/156; 713/170; 726/18
(58) Field of Classification Search ........ 713/156, 713/170, 189, 201; 726/18
See application file for complete search history.

(56) References Cited

U.S. PATENT DOCUMENTS

| | | | | |
|---|---|---|---|---|
| 4,827,508 A * | 5/1989 | Shear | ............ | 705/53 |
| 5,875,296 A * | 2/1999 | Shi et al. | ............ | 726/5 |
| 6,052,784 A * | 4/2000 | Day | ............ | 726/22 |
| 6,061,794 A | 5/2000 | Angelo et al. | | |
| 6,088,451 A * | 7/2000 | He et al. | ............ | 726/8 |
| 6,389,537 B1 | 5/2002 | Davis et al. | | |
| 6,607,136 B1 * | 8/2003 | Atsmon et al. | ............ | 235/492 |
| 6,647,494 B1 * | 11/2003 | Drews | ............ | 713/170 |
| 6,775,783 B1 * | 8/2004 | Trostle | ............ | 726/6 |
| 6,789,068 B1 * | 9/2004 | Blaze et al. | ............ | 705/64 |
| 6,941,476 B2 * | 9/2005 | Harrison et al. | ............ | 726/5 |
| 2001/0049786 A1 * | 12/2001 | Harrison et al. | ............ | 713/156 |
| 2002/0116646 A1 * | 8/2002 | Mont et al. | ............ | 713/201 |
| 2002/0133723 A1 * | 9/2002 | Tait | ............ | 713/201 |
| 2002/0144109 A1 * | 10/2002 | Benantar et al. | ............ | 713/156 |
| 2002/0169678 A1 * | 11/2002 | Chao et al. | ............ | 705/26 |
| 2003/0065940 A1 * | 4/2003 | Brezak et al. | ............ | 713/201 |
| 2003/0088790 A1 * | 5/2003 | Kaler et al. | ............ | 713/201 |
| 2003/0131096 A1 * | 7/2003 | Goringe et al. | ............ | 709/224 |
| 2004/0010682 A1 * | 1/2004 | Foster et al. | ............ | 713/156 |

FOREIGN PATENT DOCUMENTS

EP     0717 337 A    6/1996
WO    WO 01/63385    8/2001

OTHER PUBLICATIONS

Box D et al.; "Simple Object Access Protocol"; May 8, 2000 Website: http://www.w3org/TR/2000/NOTE-SOAP-20000508 p. 4.
Brown et al.; "SOAP Security Extensions: Digital Signature"; Feb. 6, 2001 Website: http://www.w3.org/TR/2001/NOTE_SOAP-dsig-20010206 pp. 1-5.
International Search Report, PCT/US03/26414; Aug. 22, 2005 pp. 1-7.

* cited by examiner

*Primary Examiner*—Nasser G Moazzami
*Assistant Examiner*—Mohammad W Reza
(74) *Attorney, Agent, or Firm*—Marger Johnson & McCollom, P.C.

(57) ABSTRACT

A credential management device has a protected domain and a credential manager to perform credential transactions. A credential transaction may comprise determining if a platform is operating in a trusted mode and releasing an operation credential if the platform is operating in a trusted mode. A credential transaction may comprise validating incoming credentials from other platforms.

13 Claims, 2 Drawing Sheets

HARDWARE-BASED CREDENTIAL MANAGEMENT

BACKGROUND

Electronic commerce (eCommerce) and business-to-business (B2B) transactions over the Internet or other networks have a critical need for assurance and trust in the communications between partners in these transactions. When a partner receives a communication from another partner, the receiving partner wants to ensure that the communication received is indeed from the sending partner. For example, a supplier receiving an order for parts in accordance with a supply contract, the supplier wants to make sure that the person sending the order is the partner with whom the supplier made the contract, not an impostor.

Currently, merchants, buyers and suppliers authenticate communications such as contracts and payments using security credentials, such as digital signatures, cryptographic keys, digital certificates and tokens. Generally, this requires complex or specialized end-entity credential management application logic on client platforms. Credential management is the foundation of the trust infrastructure. It is typically handled by software libraries, which must be manually integrated with the software applications being used for the actual transactions.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
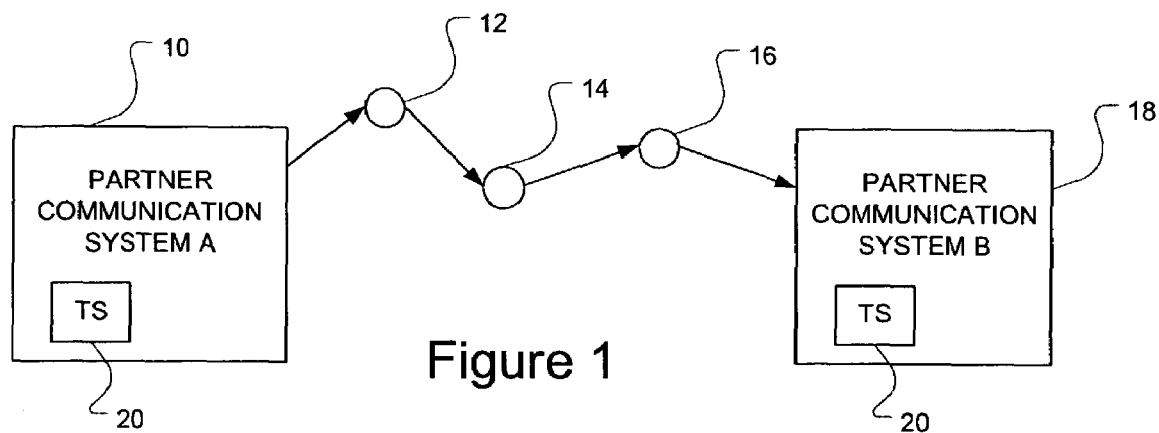
FIG. 1 shows an embodiment of a partner transaction across a network using Partner Communication Systems.

FIG. 1 shows an eCommerce communication environment between two partners each using a Partner Communication System (PCS). Note that the term PCS as used here refers to any communication system employed to allow one partner to communicate with another. For this example, assume that Partner A, 10, is a manufacturer, and Partner B, 18, is a supplier of parts for Partner A. They are relying upon network-based communications, such as the Internet, or other 'public' network, although they could also be communicating in a virtual private network (VPN). However, security concerns are far higher in the largely public Internet realm than they are in VPNs, and most eCommerce applications are designed to be run across the far-reaching and ubiquitous Internet. Note that the term Internet as used here refers to the current Internet as well as any successor networks that may takes its place in the future.

During the course of their communications, Partners A and B may route packets of information, such as order requests, contracts, purchase orders, and statements of work, through the network. The packets may 'hop' from one server, router, or any other intermediary such as a firewall or an Internet security appliance, to the next between the two partner endpoints. For example, a communication may move from partner A's communication system at 10 through a hop at a router 12, a server 14 and another router 16 before reaching its destination at partner B's communication system 18.

At any of these hops, as well as between them, a hacker or other attacker, trying to insert themselves into the transaction, could capture the information. The intent may be to gather information about one or more of the partners or to misappropriate funds, as examples. However, for whatever reason the attacker is trying to insert his or herself in the transaction, he or she will probably do it by trying to assume one of the partner's identities. Security procedures allow a partner receiving a communication to verify that the communication received was actually from the other partner, not an impostor. Security procedures include encrypting messages and enclosing a cryptographic key, a digital certificate, or a token. In the example of FIG. 1, a transaction system (TS) 20 may handle these procedures.

Figure 2:
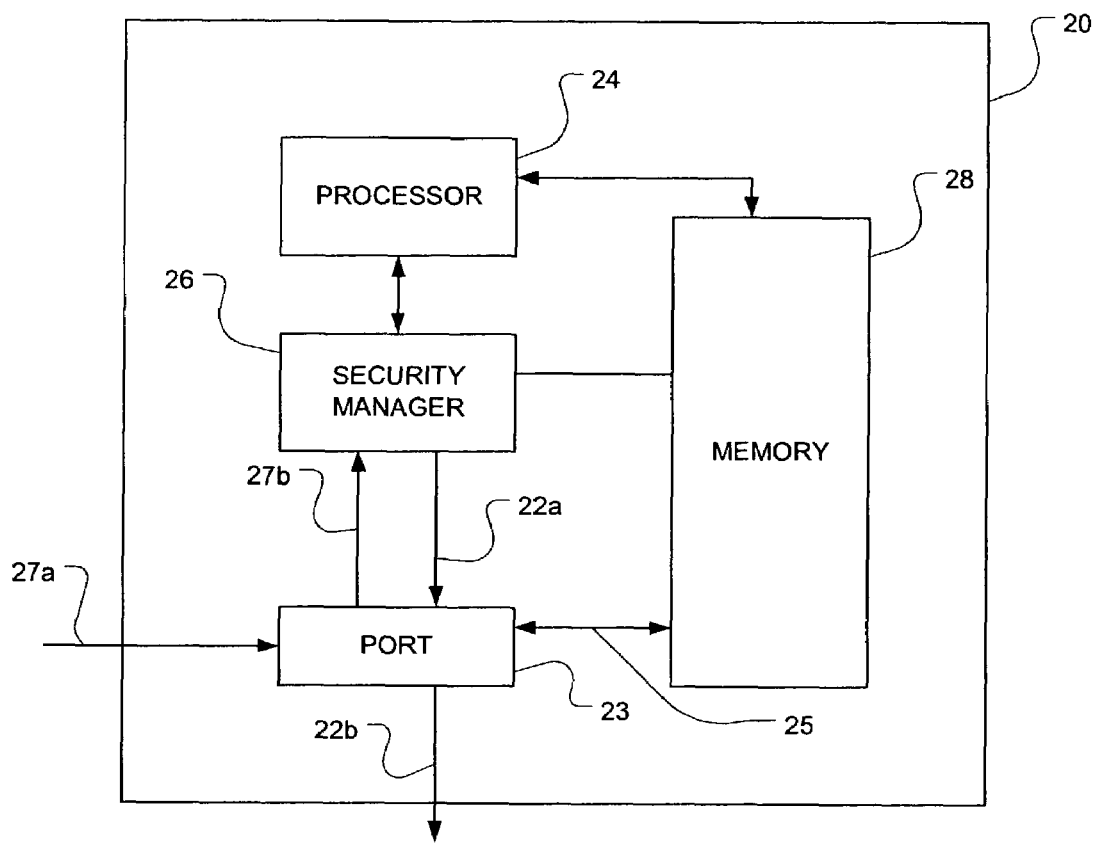
FIG. 2 shows an embodiment of a transaction system.

The PCS of either partner may take one of several forms. One embodiment of such a system is shown in FIG. 2. Within the PCS is a Transaction System (TS). This system is responsible all transactions into and out from the PCS. The processor 24, which may also be referred to as a 'host' processor, calls upon the Credential Manager (CM) 26 as necessary to allow the system 20 to communicate through the port 23.

The communication system 20 may also include a memory 28, which may also be part of the memory used for CM 26 In one embodiment, the memory may include a 'protected domain' allowing the CM 26 to make use of common resources of TS 20. The protected domain is a partition of the memory that can only be accessed by certain processes and in which CM may reside. The CM is responsible for storing valid incoming security credentials as will be discussed later.

The CM is responsible for storing, locating and registering security credentials, as well as validating security credentials provided as part of incoming messages. These operations may be referred to here as credential transactions. The CM 26 may be a separate device such as a general-purpose processor, a digital signal processor, an application specific integrated circuit, a field programmable gate array, or executable code running in a main processor, but within the protected domain. Note that the messages may include contracts, purchase orders, payments, etc., but that the object that is part of the message will also include security credentials. Within the CM is a safeguard for the platform upon which the CM is operating. If the main processor 24 of the system 20 is operating in a 'trusted' mode, the CM or components within the CM allows the releasing the appropriate operational credentials. Releasing the operational credentials then allows the CM 26 and the processor 24 to use the operational credentials to interact with other platforms. The other platforms will only interact with the system/platform 20 if it has access to the operational credentials available. Note that the term operational credential refers to operational security credentials that indicate that the platform is operating in a secure, or trusted, mode.

If the platform 20 operates in some 'unsafe' manner, where the trusted mode has been violated, whether the processor is not operating correctly, or the memory becomes corrupted, etc., the CM will not release the operational credentials. This effectively prevents the TS from functioning and therefore prevents communication between PCS A and PCS B. Similarly, the CM 26 may provide all or part of the mechanism guarding the protected domain.

The CM 26 also guards against invalid incoming credentials, protecting the transaction system from interactions with other, untrusted platforms. The incoming credential is received by the port 23 on path 27*a* and passed to the CM 26 on path 27*b*. The CM 26 returns a valid/invalid result on path 22*a* to the port 23. The port 23 then can communicate this result on path 22b. Optionally, credentials and results can be transferred to or from programs executing in memory on path 25.

In one embodiment of the invention, transactions with the CM are accessible via SOAP transactions. The Simple Object Access Protocol (SOAP) provides a platform-independent means for partners to interact across the Internet with full interoperability. One aspect of SOAP is the SOAP digital signature elements, including an element referred to as the KeyElement. This is the key transmitted with digital signatures that are in compliance with the SOAP protocol. However, the security credential module does not require any particular public key or credential infrastructure. It is designed to be compatible with all such infrastructures including X.509v3, SPKI and PGP.

X.509 is an International Telecommunications Union recommendation for digital certificates, a type of security credential. SPKI is the Secure Public Key Infrastructure, and PGP is Pretty Good Privacy. Key-based security credentials typically provide a user with a pair of keys, one public and one private. The public one is disseminated to all parties from which the user desires to receive messages. The user then uses the private key to decrypt messages encrypted using the public key. These are just examples of security credentials and are not intended to limit the scope of the claims in any way.

Using the CM of FIG. 2 allows the TS and the PCS to take advantage of a hardware-based trust engine to integrate authentication, digital signature and encryption services, such as certificate processing and revocation checking. The CM can accomplish this without the constraints and complications associated with proprietary credential software toolkits, such as PKI toolkits.

Figure 3:
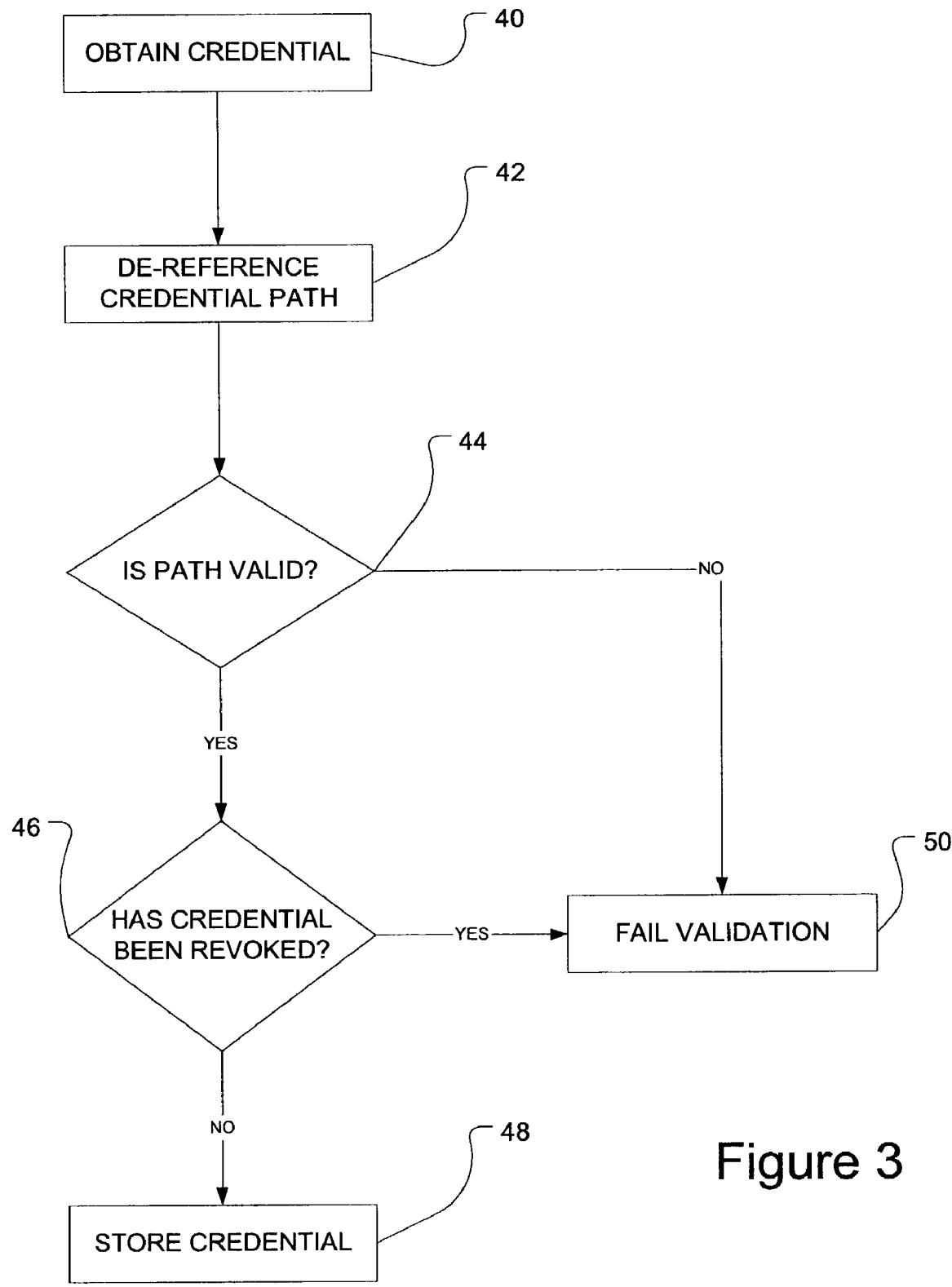
FIG. 3 shows a flowchart of an embodiment of operating a credential manager (CM).

FIG. 3 shows an embodiment of a method to operate a security credential module to determine if an incoming credential is valid and therefore if the content of the message can be trusted. At 40, the security credential is obtained. This may be done in many ways; an approach specific to SOAP will be discussed in more detail later. At 42, the credential path is de-referenced. De-referencing, as the term is used here, means to request a representation of the resource. In SOAP, the representation may be designated by a uniform resource identifier (URI).

Once the path has been determined, the validity of the path is checked at 44. Path validation generally involves determining if the source of the credential is valid. If the source is not valid, the credential fails validation at 50. If the credential source is valid, that is the path has been verified, the credential is then checked to determine if the credential has been revoked at 46. Monitoring available resources that track credentials, such as a Certificate Revocation List (CRL), or using the Online Certificate Status Protocol (OCSP) may do this. If the credential has not been revoked, the credential passes validation and the credential is stored for further use at 48. If the credential has been revoked, the credential fails validation at 50.

Specific implementations of the de-referencing and validation processes will depend upon the nature of the credential. As mentioned before, the credential may be provided as part of a Signature element of a SOAP message. The SOAP message may appear something like this:

```
<ds:Signature>
    <ds:KeyInfo>
        <ds:KeyName>
            <KEYS4YOU>
```

-continued

```
        </ds:KeyName>
    </ds:KeyInfo>
</ds:Signature>
```

In this particular example, the KeyName is the key provided with the communication.

The CM would then locate the source from which KeyName was provided and verify that it is valid. It would then determine if KeyName has been revoked. If the credential were still valid, then the CM would store KeyName, possibly in the protected domain discussed earlier.

In one embodiment using the SOAP framework, path validation may include reference validation. Three elements of the SOAP signature, SignatureMethod, SignedInfo, and SignatureValue, may be parsed from the SOAP payload. SignedInfo is the information that is actually being signed by the digital signature. This is typically canonicalized, meaning transformed into a well-defined, standard format, with a method that is shown in the element CanonicalizationMethod. The SignatureMethod element is the method that is used to convert the canonicalized SignedInfo into the SignatureValue.

In addition to the elements provided above, the credential may include an element called References. Each Reference element includes the digest method and resulting digest value calculated over the identified data object. A data object is signed by computing its digest value and a signature over that value. The signature is later checked via reference and signature validation.

In reference validation, the following process may be performed on each reference in the Reference element. The SignedInfo element is CanonicalizationMethod in SignedInfo. This allows the application to see what is signed. For instance, the CanonicalizationMethod may have rewritten the Uniform Resource Indicators (URIs) by absolutizing relative URIs. The signature process must be cognizant of this.

The data object to be digested is then obtained, and digested using the DigestMethod specified in its Reference specification. The generated digest value against DigestValue in the SignedInfo Reference. If there were any mismatch, validation would fail. It must be noted that this is a specific example of a process of reference validation within the path validation process 44 of FIG. 3 and is not intended to limit the scope of the claims.

In this manner, a faster means to manage credentials in eCommerce systems has been provided when compared to similar systems relying upon software libraries. In addition, a hardware-based implementation will allow users to have access to a trust engine that does not require any configuration, as is currently necessary.

Thus, although there has been described to this point a particular embodiment for a method and apparatus for a hardware-based trust engine for validating and managing security credentials, it is not intended that such specific references be considered as limitations upon the scope of this invention except in-so-far as set forth in the following claims.

What is claimed is:

1. A credential management device on a platform, comprising:
    a protected domain, wherein the protected domain comprises a memory partition only accessible to selected processes; and a credential manager within the protected domain, the credential manager to perform credential transactions, the credential transactions including:
    receiving a message from another platform at the credential manager, the message comprising an incoming security credential, the security credential identifying a sender;
    de-referencing the security credential path by requesting a representation of a source from which the security credential was received;
    determining if the security credential path is valid by determining if the source is valid;
    if the security credential path is valid, determining if the security credential has been revoked;
    if the security credential has not been revoked, storing the security credential in the memory partition; and
    releasing an operational credential when the platform is operating in a trusted mode.

2. The credential management device of claim 1, wherein the credential manager further comprises one of the group comprised of: a general-purpose processor, a coprocessor, a digital signal processor, an application specific integrated circuit, and a field-programmable gate array.

3. The credential management device of claim 1, wherein the credential transactions further comprise validating incoming credentials from one or more additional platforms.

4. The device of claim 1, wherein the credentials further comprise one of the group comprised of: a digital signature, a certificate, a token, a public key, and a private key.

5. The credential management device of claim 1, wherein de-referencing the security credential path further comprises de-referencing a uniform resource indicator.

6. A transaction system on a platform, comprising:
    a credential manager to manage operational credentials and to validate incoming credentials for incoming messages from a sender by:
        receiving an incoming message from another platform, the incoming message comprising an incoming security credential, the incoming security credential identifying the sender;
        de-referencing the incoming security credential path by requesting a representation of a source from which the incoming security credential was received;
        determining if the incoming security credential path is valid by determining if the source is valid;
        if the incoming security credential path is valid, determining if the incoming security credential has been revoked; and
        if the incoming security credential has not been revoked, storing the incoming security credential; and
        releasing an operational credential when the platform is operating in a trusted mode;
    a memory to store valid ones of the incoming security credentials; and
    a protected domain in which the credential manager resides, wherein the protected domain comprises a partition of the memory that is only accessible by certain processes, wherein the valid ones of the incoming security credentials are stored in the partition.

7. The system of claim 6, wherein the system further comprises a host processor.

8. The system of claim 6, wherein the system further comprises a communications port through which the incoming messages are received.

9. A method of operating a credential manager on a platform, the method comprising:
    receiving a message from another platform, the message comprising an incoming security credential, the security credential identifying a sender, wherein the credential manager resides in a protected domain;
    de-referencing the security credential path by requesting a representation of a source from which the security credential was received;
    determining if the security credential is valid by determining if the source is valid;
    if the security credential path is valid, determining if the security credential has been revoked;
    if the security credential has not been revoked, storing the credential in the protected domain, wherein the protected domain is a memory partition only accessible by selected processes; and
    releasing an operational credential when the platform is operating in a trusted mode.

10. The method of claim 9, wherein the incoming security credential is one of the group comprised of: a digital signature, a certificate, a token, a public key and a private key.

11. The method of claim 9, wherein de-referencing the security credential path further comprises de-referencing a uniform resource indicator.

12. The method of claim 9, wherein the method further comprises failing validation if the security credential path is invalid.

13. The method of claim 9, wherein the method further comprises failing validation if the security credential has been revoked.

* * * * *